US009165417B2

(12) United States Patent
Vallès Fontanals et al.

(10) Patent No.: US 9,165,417 B2
(45) Date of Patent: Oct. 20, 2015

(54) METHOD AND SYSTEM FOR THE PROTECTION OF VOTING OPTIONS FOR REMOTE VOTING

(75) Inventors: Pere Vallès Fontanals, Barcelona (ES); Pablo Sarrias Bandrés, Barcelona (ES); Jordi PuiggalíAllepuz, Barcelona (ES); Sandra Guasch Castelló, Barcelona (ES)

(73) Assignee: SCYTL SECURE ELECTRONIC VOTING, S.A., Barcelona (ES)

( * ) Notice: Subject to any disclaimer, the term of this patent is extended or adjusted under 35 U.S.C. 154(b) by 52 days.

(21) Appl. No.: 13/036,491

(22) Filed: Feb. 28, 2011

(65) Prior Publication Data

US 2012/0217299 A1 Aug. 30, 2012

(51) Int. Cl.
*G06K 17/00* (2006.01)
*G07C 13/00* (2006.01)

(52) U.S. Cl.
CPC ..................................... *G07C 13/00* (2013.01)

(58) Field of Classification Search
CPC .... G07C 13/00; G07C 13/02; G07C 9/00158; G06Q 10/10; G06Q 50/26; H04L 63/0861; H04L 63/12; G06K 2017/0045; G06K 2017/009; G06K 7/10346; G06K 17/0032; G06K 13/02; G06K 2017/0038; G06K 7/14
USPC ............................................ 235/386; 705/12
See application file for complete search history.

(56) References Cited

U.S. PATENT DOCUMENTS

| | | | | |
|---|---|---|---|---|
| 7,306,148 | B1 | 12/2007 | Morganstein | |
| 7,753,273 | B2 | 7/2010 | Cummings | |
| 2004/0024635 | A1* | 2/2004 | McClure et al. | 705/12 |
| 2004/0195322 | A1* | 10/2004 | Hurewitz | 235/386 |
| 2005/0218224 | A1* | 10/2005 | Boldin | 235/386 |
| 2007/0007341 | A1 | 1/2007 | Poulin et al. | |
| 2008/0054074 | A1* | 3/2008 | Quine et al. | 235/386 |
| 2010/0252628 | A1* | 10/2010 | Chung | 235/386 |

OTHER PUBLICATIONS http://www.openvotingconsortium.org/.
http://www.everyonecounts.com/index.php/elections/elect_today.
USPTO Non-final Office Action issued in U.S. Appl. No. 13/420,674 mailed Mar. 16, 2015.

* cited by examiner

*Primary Examiner* — Thien T Mai
(74) *Attorney, Agent, or Firm* — RatnerPrestia

(57) ABSTRACT

The method includes using a voting computer to represent the user selected voting options gathered by a voting application running in the voting computer, using an element that has a machine readable format such as a barcode, recording then the element in a physical media using a printing device connected to the voting computer, so that it is suitable to be delivered by the user using a physical channel such as a postal service to the electoral officers. Once the delivered physical media is received by the intended destination (e.g., election officials), the method introduces the step of reading the element information contained in the physical media using a reading device connected to a retrieving computer. Finally, the method introduces a process for generating a physical ballot in the retrieving computer using the information delivered by the voter and a printing device.

19 Claims, 2 Drawing Sheets

METHOD AND SYSTEM FOR THE PROTECTION OF VOTING OPTIONS FOR REMOTE VOTING

FIELD OF THE INVENTION

The present invention relates to a method for using a voting computer to generate an element that contains a machine readable representation of the information about the selections made by a voter, so that said generated element can be transmitted to a remote location. This generated element that contains a machine readable representation of the information about the selections made by the voter allows the reconstruction of a physical record in a retrieving computer by means of a reading device and a printing device that represents these selections in such a way that the physical record can be read by a specific optical scanner (e.g. in a paper ballot).

The invention also refers to a system for implementing the cited method.

BACKGROUND OF THE INVENTION

Absentee ballots are used in elections to allow registered voters to cast their ballots remotely. Therefore, some states have provisions for emailing ballots, faxing ballots, or delivering them in person to a designated location.

However, the delivery process and counting of these ballots are not free from errors that could prevent the processing of cast votes. To this end, several proposals have been focused on reducing these issues with more or less success.

The proposal of the method and system described in this invention is to solve all these issues, including the ones not yet solved by other proposals. Below we will analyze the different problems, how are they managed by the currently existing solutions and how our proposal covers the gaps not yet solved by these solutions.

Blank Ballot Delivery by Mail

The absentee ballots are usually sent initially by post to the voters. This process is usually called blank ballot delivery. Then, the voter marks her selections in the blank ballot and mails it back to her State election officials for its counting. Once the marked absentee ballots are received in the central election offices, they are counted either manually or electronically.

However, this system presents several problems:

- Blank ballot delivery on time: One of the most challenging issues in absentee voting is how to bring the ballots to the absentee voters on time. The initial blank ballot delivery time depends on the deadline for the addition of candidates or questions to the ballot, and it is usually close to the start of the voting period. Therefore, postal mail is not always fast enough to deliver the ballots on time for filling and mailing them back to the state in the time period assigned to the absentee voting process. In fact, several times, absentee ballots have not been accepted in the vote recount for arriving late. Therefore, absentee voters are disenfranchised.
- Manual marking of optical scanner votes: Usually, most States use optical scanning for electronic counting of in person votes. Furthermore, the electoral law forces them to use the same counting system for absentee voters. Therefore, in these cases, election officers need to count the absentee ballots thought optical scanners. Postal votes cannot be directly fed into the optical scanners since they are folded inside the envelope (folded sheets tend to stuck in optical scanners). Therefore, electoral officers are in charge of manually copying the selections coming from these absentee votes to the optical scanner compatible votes. This leads to the possibility of human errors or malicious electoral officers modifying the contents of the absentee votes.
- Invalid votes due to voter mistakes: The blank ballot is manually marked, and it is not checked after the time of counting. Therefore, the voter cannot be warned while filling the ballot in case she is making any mistake that could invalidate it (e.g. under-voting or over-voting). The result is that a considerable amount of absentee votes are invalidated and the voter it is not aware about it.

Therefore, alternative absentee ballot delivery methods have been introduced recently, like the electronic blank ballot delivery, or the online ballot marking.

Electronic Blank Ballot Delivery

In the electronic blank ballot delivery proposal, the voter accesses to a web service to download her blank ballot in an electronic format. Then, voter prints the blank ballot and manually fills in. The mailing back and counting process is the same than in the mail blank ballot delivery system.

This system solves the problem of the blank ballot delivery on time, but it does not address issues on the manual marking of optical scanner votes or having absentee invalid votes due to voter mistakes.

Online Ballot Marking

In case of online ballot marking, the voter accesses to a web application that displays the voting options and guides her through the process of making her selections. At this point, the marked ballot is printed in paper to mail or fax it back to the state.

This system solves the problems of blank ballot delivery on time and prevention of voter mistakes while filling the ballot. Regarding the manual marking of the votes to be read in optical scanners, despite there are some proposals in this area, none of them solve this issue.

The Open Voting Consortium [1] and EveryoneCounts [2] propose a system for electronic ballot marking that prints the marked ballot in paper and attaches a bar code representing the voting options. After the voting phase, the barcodes of these votes are read with a barcode reader to perform an electronic count, but in any case they are proposing any method for creating a vote that can be processed by an optical scanner. Therefore, these systems cannot be used in the States were election officers need to count the votes using optical scanning. Furthermore, the format of the ballot is not the same as the ones cast in polling stations. Therefore, they are distinguishable from these votes in a manual counting process.

In the state of the art, there are other proposals, like AutoMark (U.S. Pat. No. 7,753,273) or Populex (U.S. Pat. No. 7,306,148), that provide an electronic interface for ballot marking and printing of votes in a format suitable to be read by an optical scanner. However, these proposals are related to specific devices designed to be used in polling places. Therefore, these solutions cannot be used in absentee voting processes since they cannot be distributed to voters (i.e., they have a standalone architecture).

The object of the present invention is a ballot marking method suitable to be used in a voting computer by an absentee voter that generates an element representing the voting options in a physical machine readable media, such as a printed bar code. On the reception of this generated element in the election central office, the information of the generated element is used for issuing a printed ballot that is suitable for being processed by an optical scanner or manual counting. The difference with the existing proposals is that the information of the generated element (e.g., bar code contents) is not processed for generating a result, but for generating a paper ballot that has exactly the same appearance as the paper ballots from non-absentee voters. Therefore, absentee ballots can be counted by the same automated means (e.g., optical scanning machines) used for counting the paper ballots from the rest of the voters.

REFERENCES

[1] http://www.openvotingconsortium.org/

[2] http://www.everyonecounts.com/index.php/elections/elect_today

SUMMARY OF THE INVENTION

Accordingly, it is an object of the present invention to provide a method for casting a vote from a remote location containing the selections made by a voter by electronic means (e.g., an absentee voter casting a vote using her own computer), that facilitates the final counting of these voter selections using the same counting means as regular votes marked by hand, consisting of:

a) Generating, using a voting computer, an element that represents in a machine readable format at least the information of one or more selections made by a remote voter; recording, using the voting computer, this generated element in a physical support, and sending this physical support through a physical channel to a central election office;

b) Receiving the physical support in the central election office and using a retrieving computer with a reading device, reading the machine readable element from the said physical support and retrieving the selections made by the voter from the reading process.

c) Using a printing device connected to the retrieving computer generate a physical representation of the retrieved original selections susceptible of being processed by the same electronic counting means (e.g. optical scanner) used to count the regular votes.

To this end, the method proposes the use of a voting computer to represent the user selected voting options gathered by a voting application (running in the said voting computer), using an element that has a machine readable format. This element is then recorded in a physical media using a printing device connected to the voting computer, so that it is suitable to be delivered by the user using a physical channel. In a preferred implementation, the method proposes to use a barcode to represent the element, printing this barcode in a paper for being delivered through postal service to the electoral officers. As an option, the method also proposes to use the voting machine to generate a human readable version of the selected voting options that it is included with the other physical media sent to the electoral officers. This human readable version could contain the name of the selected voting options or the code that uniquely identifies these selected options.

Another proposal is to use the voting machine to encode the contents of the element before being printed (e.g., by means of symmetric or asymmetric encryption). In this case, these contents can only be processed by the receiver (since it should be the only one that has the decryption key).

Once the delivered media is received by the intended destination (e.g., election officials), the method introduces the step of reading the element information contained in the physical media using a reading device connected to a computer (e.g., a retrieving computer). For instance, in case the element is represented as a barcode, the reading process will consist on using a barcode scanner for processing the contents. In case the information is encoded, the method also introduces several ways for decoding the information in a safe way using a retrieving computer. For instance, this method proposes the use of secret sharing schemes or multi-party computation techniques to enforce the collaboration of several actors in the decryption process.

Finally, the method introduces a process for generating a physical ballot in the retrieving computer using the information delivered by the voter and a printing device. This physical ballot will have a specific format that allows its processing by standard counting means: manual counting or optical scanner. To this end, the information can be printed using a pre-existing blank ballot or just a blank sheet. Therefore, the resulting print-out can be processed the same way as the votes cast in the polling stations. For instance, printed votes can be directly fed-in electronic counting optical scanners without requiring the election officers to fill-in manually optical scan ballots.

The method also introduces optional audit processes that are focused to detect any ballot printing problems that could generate a vote that does not really reflect the real intent of the voter. One of these processes consist on using the human readable representation of the vote generated by the said voting machine, by comparing that the printed vote contains the same selections present in the human readable representation.

The invention also refers to a system for implementing the disclosed method, intended for generating a physical copy of the selections made by a remote user that is counted in a specific optical scanner and comprising:

a) a voting computer for capturing the one or more selections made by a voter and generating an element that represents in a machine readable format at least an information of the selections made by the user and recording this element in a physical support;

b) a physical delivery channel for sending this physical support to a central office; and c) a retrieving computer located at said central office with a reading device for reading and retrieving the selections made by the voter from the machine readable element inserted in said physical support, and with a printing device for printing a physical representation of the selections retrieved in the same ballot format used by a specific optical scanner used at said central office for counting the results.

In a preferred embodiment the proposed system a barcode is used as a machine readable format, as a physical support a paper, as a physical delivery channel a postal service or FAX service, as a reading device a barcode scanner, and as a printing device a printer.

As per another embodiment of the proposed system the retrieving computer is retrieved in a first retrieving computer with the reading device for reading and retrieving the selections made by the voter, and a second retrieving computer with the printing device for printing a physical representation of the selections retrieved, both first and second retrieving computers having communication or storage means for interchanging the retrieved selections made by the voter.

In a further embodiment of the proposed system it additionally comprises a network server and an electronic communication channel between this network server and the voting computer, used by the voting computer for sending an electronic representation of the voter selected voting options to said network server.

Figure 1:
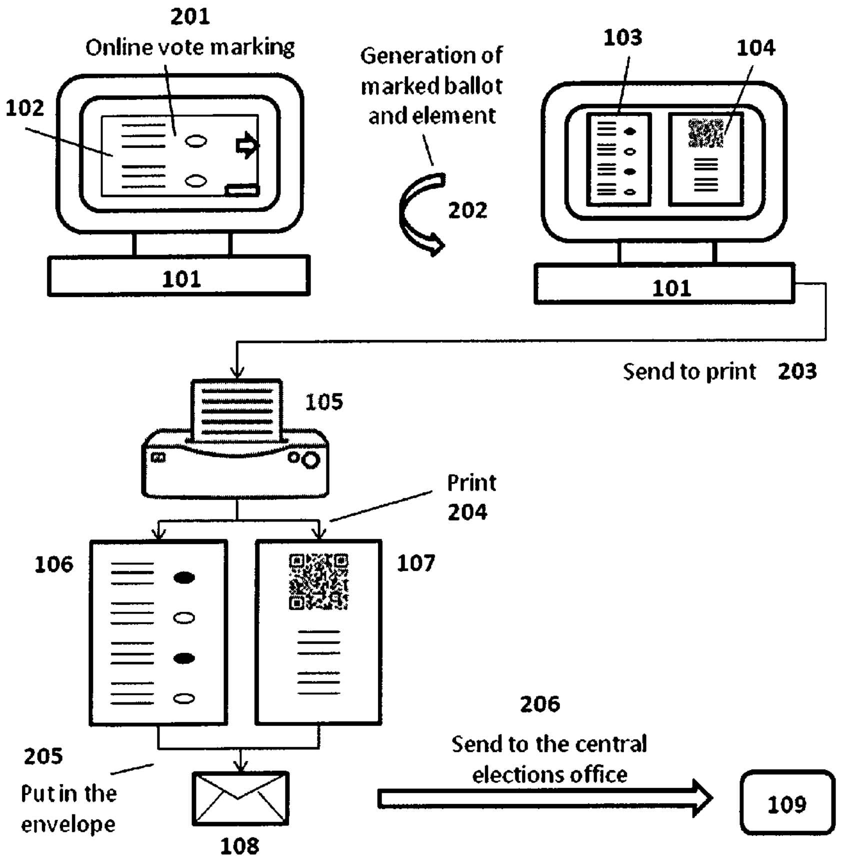
FIG. 1 identifies the main elements and processes of the method executed by the voter, using as reference a preferred embodiment that uses a postal delivery channel.

a) The absentee voter uses an online absentee ballot marking application 102 running in a voting computer 101 to fill in 201 her ballot.

b) Once the voter has selected all the options, the electronic marked ballot 103 and an element containing the voter selections 104 are electronically generated 202 in the voting computer 101.

c) Both the electronic marked ballot 103 and the element containing the voter selections 104 are sent 203 to the printer 105, where an element containing the voter selections 107 and optionally a marked ballot 106 are printed 204.

d) The element containing the voter selections 107 and the marked ballot 106 (if printed) are sent 206 to the central elections office 109, for instance using a postal envelope 108.

Figure 2:
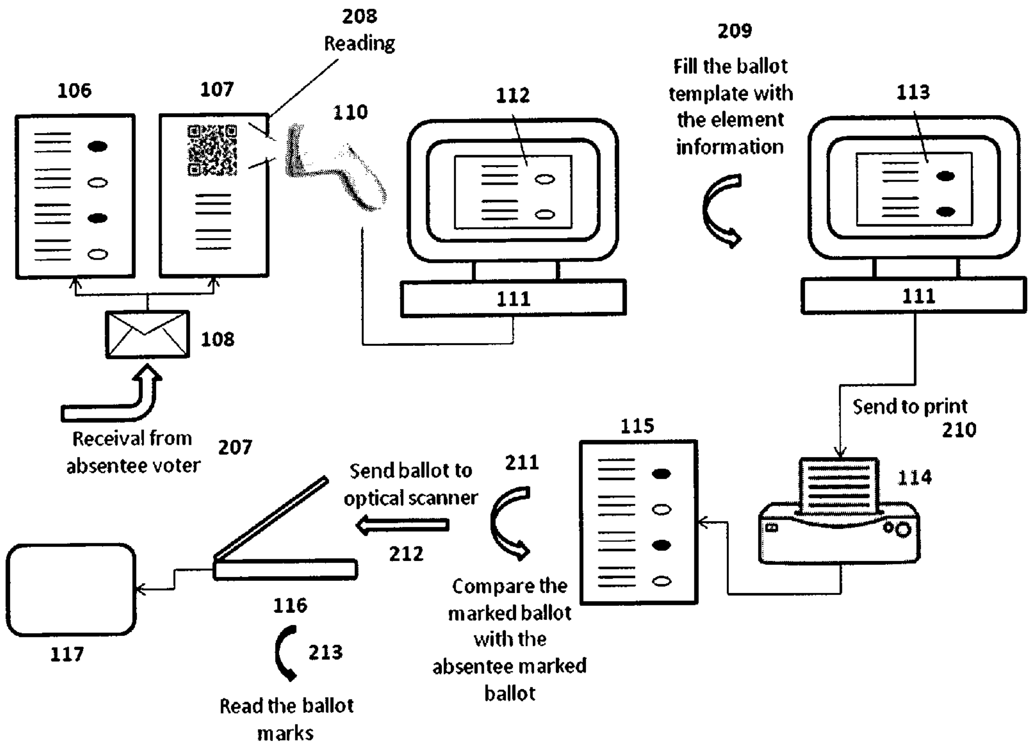

FIG. 2 identifies the main elements and processes of the method executed by the election officers, using as reference a preferred embodiment that uses a postal delivery channel:

a) When the envelope 108 sent by the absentee voter is received 207, the element containing the voting selections 107 is read 208 with a bar code reader 110 connected to a retrieving computer 111.

b) The selected voting options 112 obtained from the reading 208 process are used to fill in 209 a ballot template in the retrieving computer 111 obtaining an electronic marked ballot 113, which is sent 210 to a printer 114.

c) The printed marked ballot 115 is optionally compared 211 with the absentee marked ballot 106 if this one has been received. If the comparison is not successful, the method can be aborted in this step for the element containing the voting selections 107 under process.

d) Finally, the marked ballot 115 is sent 212 to the optical scanner 116, where the voter selections are read 213 and sent to the electronic counting service 117 to perform the vote count.

DETAILED DESCRIPTION OF THE INVENTION

It is an object of the present invention to provide a method for casting a vote from a remote location containing the selections made by a voter by electronic means (e.g., an absentee voter casting a vote using her own computer), that facilitates the final counting of these voter selections using the same counting means as regular votes marked by hand, consisting of:

a) Generating, using a voting computer, an element that represents in a machine readable format at least the information of one or more selections made by a remote voter, using said voting computer to record this element in a physical support, and sending this physical support through a physical channel to a central election office;

b) Receiving the physical support in the central election office, reading the machine readable element from the said physical support using a reading device, and retrieving the selections made by the voter from the reading process using a retrieving computer.

c) Generating using a printing device, a physical representation of the retrieved original selections susceptible of being processed by the same electronic counting means (e.g. optical scanner) used to count the regular votes.

The following sections describe in more detail the phases of the object of the invention:

1. Generation and sending of an element that represents a machine readable information of the selections made by a remote voter;

The method assumes the existence of an electronic voting application running in a voting computer that initially captures the voter intent before proceeding with the vote casting process. Therefore, the voter intent captured by this voting application (consisting on at least a set of voter selected options) is used by the method described in this invention for casting and counting a vote.

This electronic voting application can be any application known from the current state of the art, such as a standalone computer program or a web based application, or any future implementation that copes with the same objective of capturing voter selections. For instance, in the case of absentee voters, this electronic voting application can be an online ballot marking system that guides the voter through the vote selection process and captures the voter selections in an electronic form. This online ballot marking system can be a web based application accessed by the voter using her own computer at home.

After the voter intent has been captured by the application, the proposed method starts generating in the voting computer an element that represents at least the voting options selected by the voter. This representation of the element is done using a machine readable format for allowing the automatic processing of the element contents by a machine (e.g., a barcode scanner). The machine readable representation of the element is then recorded or printed in a physical media (e.g. using a printing device), allowing its delivery through a physical channel, such as a postal service.

Optionally, in addition to the machine readable representation of the element, a human readable representation of the voting options generated by the said voting computer can be recorded or printed in the same physical media. Therefore, this option allows any person to audit by human means (e.g., reading) the proper interpretation of the machine representation of the element by any machine.

Another option of the proposed invention consists on using the voting computer for encoding the selected voting options before generating their representation in a machine readable format. This encoding can be done using compression, encryption, or a combination of both. In case of data compression, any algorithm known from the current state of the art or equivalent can be used, such as a ZIP or GZIP formatting function. In case of data encryption, any symmetric or asymmetric algorithms can be used, such as AES, RSA, ElGamal or any based on Elliptic Curves.

In a preferred embodiment, the representation of the selected voting options is alphanumerical, such as the name of the option or question and the one or more selected responses or preferences. For instance, the representation can be a set of attribute and value pairs such as:

question1=response__1, question2=response__2, . . . , question_n=response_n

This alphanumerical representation can be also formatted using known formatting methods, such as XML, SML, ASN1, CSV or any other possible data representation format.

In a second preferred embodiment, the voting computer is used to generate an element with the machine readable representation of the selected voting options using a format susceptible of being printed or recorded in a physical media (e.g., a barcode). In this case, the said element contains, in addition of the representation of the voting options, other recovery information. This recovery information allows the reconstruction of the original selected voting options represented in the element in case the printed or recorded representation of the element is partially damaged. Examples of these types of element representation are any 1 or 2 dimension barcode, such as a PDF417.

In any of the preferred embodiments, a human readable representation of the element contents can be optionally generated using the voting computer and printed in or attached to the physical media that contains the machine readable version of these options. Therefore, the voter could verify if the human readable version of the options corresponds to his/her intent before sending them to a central election office.

In an alternative embodiment, in addition of sending the physical media with the machine readable representation of the element, an electronic representation of the selected voting options is also generated by the voting machine. This electronic representation can be generated by using the same voting application used to capture the voting options or any other application connected to the former. The electronic representation can be stored in the same machine that executes the voting application (the voting machine) or can be sent through a networked server through a communication network (e.g. sent to a voting server located in a central election office or in another place managed by electoral officers). In any of these cases, the electronic representation of the votes can be encoded before being stored or delivered. If so, any of the proposals described to encode the machine readable representation of the element can be used (i.e., compression or encryption).

2. Receiving the physical support in the central election office, reading the machine readable element from the physical support, and retrieving the original selections made by the voter.

In this phase the element is received by the election office (e.g., the State Board of Elections office).

After the reception, the machine readable representation of the element is read from the physical support using a reading device connected to a retrieving computer, to recover the information about the voter selections. This device could be a barcode reader (connected to a computer or handheld device), an optical scanner or any other system that is able to interpret the format in which the element has been recorded or printed in the physical media.

For instance, in the preferred embodiment introduced before in which the element is represented using a 1D or 2D barcode, the device could be a barcode scanner or optical scanner.

The reading process can be implemented in a supervised or automated form. If the process is supervised, a person (e.g., operator) will operate the device for reading each individual physical media. When the process is automated, the physical support can be introduced in groups or batches in the device that reads them without requiring supervision.

The contents of the representation of the element (i.e., the selected options) is then stored in an electronic format in a retrieving computer for the processing in the next phase of this method. Alternatively, the retrieved information or a copy of it can be stored in medium/long term storage media for future processing.

In case the retrieved information was encoded, the retrieving computer can be also used to decode this information before being stored or processed by the next step of the method. The decoding process can be managed by the same operator, another privileged person or could require the collaboration of several persons for the complete decoding. In case it is required the participation of several persons for the decoding, a cryptographic secret sharing scheme or secure multi-party computation method can be used to force this collaboration. Multiple examples of these schemes or methods can be obtained from the current state of the art, such as the Shamir secret sharing scheme.

3. Generating using a printing device a physical representation of the retrieved original selections susceptible of being processed by the same electronic counting means used to count the regular votes.

In this final step, the electronic representation of the selected voting options is then printed in a physical media (e.g., paper), using a printing device and the same media and format used by voters when manually selecting their voting options.

For instance, in a preferred embodiment, a printing device could be used to print a vote in such a format that it can be processed by a specific optical scanner counting machine or any manual counting process. In this case, the printing device can use the same blank ballot used by voters and, therefore, this device only marks the positions assigned to the selected voting options. Another possible implementation is to print the full ballot template and selected options using a blank page.

This printing process can be implemented in a printing device attached to the retrieving machine used to get the information about the voter selections, or in a different machine (i.e., a second retrieving computer) that has access to the information read by the recovery device. This information access link between the (first) retrieving computer and the second retrieving computer can be based on using shared storage means (network disk), removable media (pen drive, CD or removable disk unit) or a network communication service for interchanging information through a LAN/WAN connection (FTP, Web, Mail, etc.).

The printing process can be also done just after each machine readable element from a physical media has been read instead of waiting for reading all of them.

As an optional step, if the voter also delivered a human readable version of the selected options, a printing device operator or an authorized person could compare the printed ballot with the human readable information. This process will allow ensuring that the printed ballots contain exactly the same selected options as the human readable version sent by the voters. In case there are divergences, the printed ballot could be discarded. This verification is interesting, since during the transport process after voter delivery, the physical media containing the machine readable representation could be damaged. Therefore, the reader device and the retrieving computer could retrieve wrong information from the representation or no information at all. To reduce the risk of retrieving wrong or no information, the use of barcodes o similar formats is recommended, since they contain recovery information. This optional step also allows detecting discrepancies between the original selected voting options and the ones retrieved by the machine reading process.

This step can be done for all the physical media received from the voters. In this case, the verification can be done by comparing the human readable selections of the received physical media, and the contents of the print-out generated from the machine readable element of the same physical media. This verification can be done one by one or by groups. When done by groups, the verification is done based on checking the overall selected options from all the received media all together instead one by one.

Finally, the verification process can be done under a defined percentage of the received media. In this case, the specific percentage could be based on any legal requirement that applies to the counting process.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed is:

1. A method for the protection of voting options for remote voting in which a physical copy of the selections made by an absentee voter is generated using a selection application suitable of being executed in a remote environment, comprising:

a) generating, by the absentee voter, using a voting computer, an absentee marked vote in a physical support including an element that represents in a machine readable format at least the information of one or more selections made by said absentee voter, and sending this physical support through a physical channel to a central election office;

b) receiving, by an operator at said central election office, the physical support and using, the operator, a retrieving computer with a reading device for reading the machine readable element of said physical support and retrieving the selections made by the absentee voter from the reading process;

c) filling in a ballot template with the retrieved selections;

d) generating, by the operator, using a printing device connected to the retrieving computer, an absentee marked paper ballot based on the ballot template that has the same format and appearance as paper ballots from non-absentee voters; and e) counting the generated absentee marked paper ballots by the same automated means used for counting the paper ballots non-absentee voters.

2. A method, according to claim 1, further comprising using the voting computer for additionally generating and including a human readable representation of at least the absentee voter selected options in the same physical support or a different second physical media but sending this second physical media together with said physical support.

3. A method, according to claim 1, further comprising using the voting computer for additionally generating an electronic representation of the absentee voter selected options and sending this electronic representation through an electronic communication channel to a voting server located at a central office or other place managed by electoral officers.

4. A method, according to claim 3, further comprising using the voting computer to encode the information included in the electronic representation of the absentee voter selected options before sending them.

5. A method, according to claim 1, further comprising using a barcode as the machine readable format of the element representing the selections made by the absentee voter.

6. A method, according to claim 1, further comprising using a paper sheet as the physical support for including by printing the machine readable element representing the selections made by the absentee voter.

7. A method, according to claim 1, further comprising using a postal service as the physical channel.

8. A method, according to claim 1, further comprising using the voting computer for encoding the information of the absentee voter selected options before generating the said element.

9. A method, according to claim 8, wherein the information is being encoded by means of a compression function and/or an encryption function.

10. A method, according to claim 9, further comprising using the retrieving computer to decode the encoded information after the encoded information being read with a reader device, and retrieving the selections made by the absentee voter from the decoded information.

11. A method, according to claim 5, further comprising using a barcode reader as the reading device used for reading the barcode representation of the element representing the selections made by the absentee voter.

12. A method, according to claim 1, further comprising storing in step b), a copy of the retrieved selections made by the absentee voter in a storage media connected to the retrieving computer.

13. A method, according to claim 1, wherein generating the absentee marked paper ballot comprises printing the selections with a blank ballot template in a blank sheet of paper, using the printing device.

14. A method, according to claim 1, wherein generating the absentee marked paper ballot comprises generating a physical representation of the retrieved selections made by the remote voter by printing, using the printing device, the selections as marks in the checkboxes of a blank ballot paper.

15. A method, according to claim 14, wherein the printed absentee marked paper ballot being used for counting the results of the selections made by the absentee voter using a specific optical scanner counter.

16. A method, according to claim 2, further comprising comparing the absentee voter selected user options represented in a human readable representation with the absentee voter selected options represented in the generated absentee marked paper ballot and the comparison being made for deciding if the generated absentee marked paper ballot is a valid representation.

17. A method, according to claim 1, wherein the printed absentee marked paper ballot being used for counting the results of the selections made by the absentee voter using a specific optical scanner counter.

18. A method, according to claim 13, wherein the printed absentee marked paper ballot being used for counting the results of the selections made by the absentee voter using a specific optical scanner counter.

19. A method, according to claim 3, further comprising comparing the absentee voter selected options represented in an electronic representation with the remote voter selected options of the generated absentee marked paper ballot and the comparison being made for deciding if the generated absentee marked paper ballot is a valid representation.

* * * * *